No. 649,808. Patented May 15, 1900.
M. BYSTROM.
PLOW.
(Application filed Feb. 14, 1900.)
(No Model.)
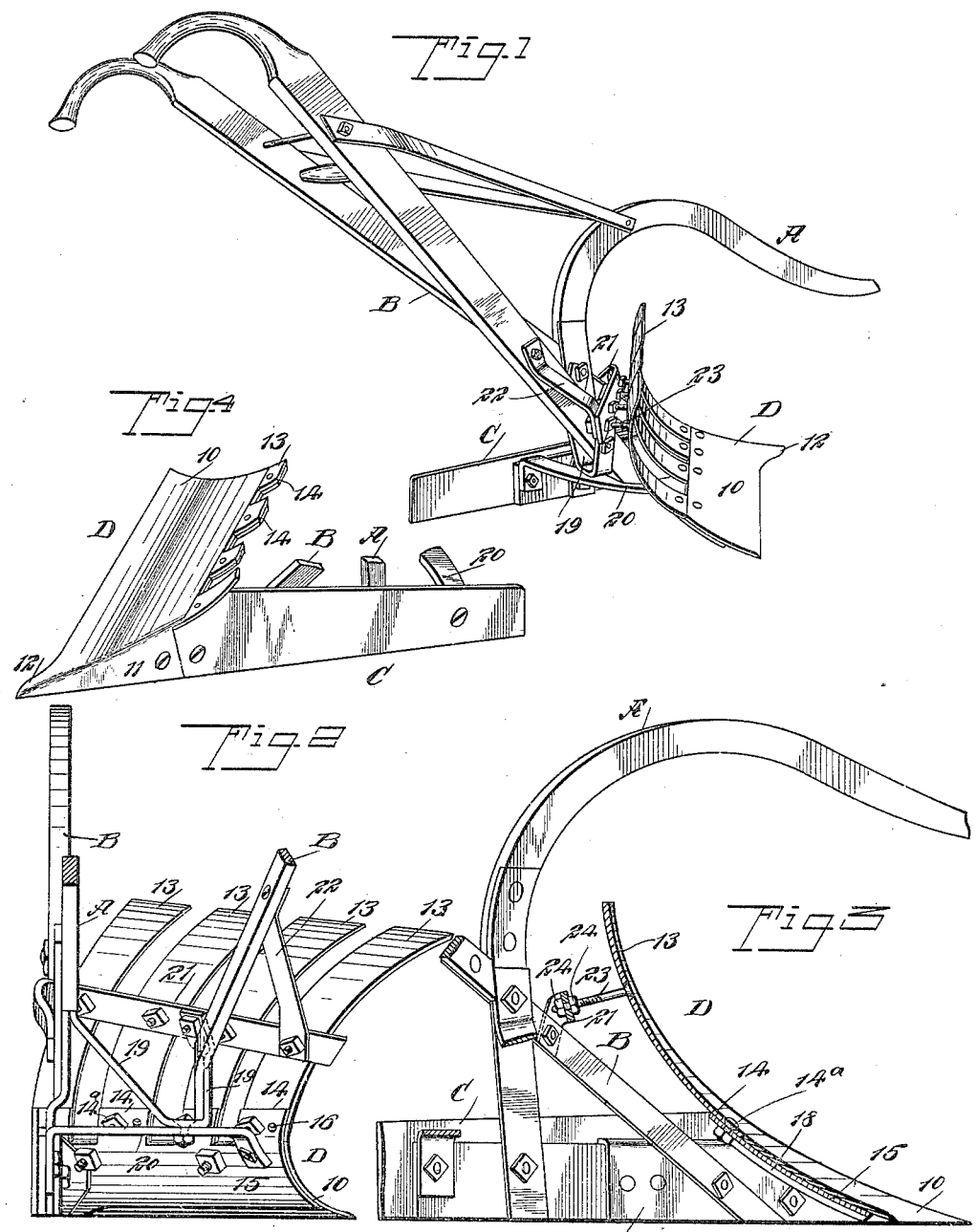
WITNESSES:
INVENTOR
Michael Bystrom
BY
ATTORNEYS

UNITED STATES PATENT OFFICE.

MICHAEL BYSTROM, OF CENTREVILLE, SOUTH DAKOTA.

PLOW.

SPECIFICATION forming part of Letters Patent No. 649,808, dated May 15, 1900.

Application filed February 14, 1900. Serial No. 5,217. (No model.)

*To all whom it may concern:*

Be it known that I, MICHAEL BYSTROM, a citizen of the United States, residing at Centreville, in the county of Turner and State of South Dakota, have invented a new and Improved Plow, of which the following is a full, clear, and exact description.

One purpose of the invention is to construct an easy-running plow having a fingered moldboard and means for quickly and conveniently adjusting the fingers of the moldboard, so that any undesirable material upon the field—such as weeds, long stubble, straw, &c.—may be covered up whether the ground be loose and dry or wet.

Another purpose of the invention is to so construct the plowshare that it will produce a straight well-defined cut and the point will remain sharp for a long time and so that the landside will be subjected to but little pressure and the share will scour itself and be kept clean in almost any kind of soil.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a plow constructed in accordance with my invention. Fig. 2 is an enlarged perspective view of the rear portion of the plow, parts being in section. Fig. 3 is a vertical section through a portion of the said plow, particularly through the moldboard; and Fig. 4 is a perspective view of the moldboard and landside, illustrating the manner in which they join, the fingers of the moldboard being broken off.

A represents the beam of the plow; B, the handles; C, the landside, and D the moldboard. The moldboard is made in two sections—a lower uninterrupted or comparatively-straight blade-section 10 and an upper finger-section, the fingers 13 of which section are of any desired number. The blade-section 10 of the moldboard at one end is carried downward vertically at a right angle to the body, forming the forward portion 11 of the landside C and likewise a portion of the point of the plowshare, which point is also partially formed by enlarging the blade-section 10 of the moldboard at the downwardly-extending member 11, so that a decided and well-defined point 12 is obtained. The fingers 13 are at any suitable distance apart, and these fingers follow the curvature of the blade-section 10 and are at more or less of a rearward inclination. The fingers at their lower ends abut against the upper edge of the blade-section 10 of the moldboard, as shown in Figs. 1 and 4, and are adjustably attached, preferably, to extensions 14 from a plate 15, which is secured in any suitable or approved manner to the under face of the blade-section of the moldboard, as shown best in Fig. 2. Usually the connection between the fingers 13 and the projections 14 is made through the medium of bolts $14^a$, passed through both parts, said bolts being provided with suitable nuts, and in order that the fingers may be adjusted to or from the rear of the plow each finger is provided with a single opening, through which a bolt $14^a$ is passed, while the projections 14 from the supporting-plate 15 are provided with two apertures 16, into either one of which the said bolts $14^a$ may enter. In this manner the various fingers may be brought closer together or carried farther apart, as the character of the soil may demand.

The landside C may be made of one or more pieces, but is usually constructed of a single piece of metal, and the forward end of the landside abuts against the rear end of the downwardly-bent member 11 of the blade-section of the moldboard, as shown in Fig. 4, and the landside is attached to the blade-section 10 of the moldboard D through the medium of a frog 18 of any desired construction.

The left-hand handle is attached to the inner face of the landside or to the inner face of the frog 18 and to the beam A of the plow, while the right-hand handle is attached to the right-hand member of a substantially V-shaped bracket 19, which bracket is secured upon a cross-bar 20, extending from the landside to the blade-section of the moldboard at or near the rear portion of these two parts. An upper cross-bar 21 is usually attached to the left-hand handle and to a bracket 22, which extends downward from the right-hand handle, and the said cross-bar 21 loosely receives a series of bolts 23. These bolts correspond in number to the number of fingers 13 provided for the moldboard, and the head of each bolt is countersunk or is otherwise flushly secured to the rear face of each finger, and each bolt 23 is usually provided with two nuts 24, one at each side of the upper cross-bar 21, as shown in Fig. 3, so that when the lower bolts 14ª of the moldboard are loosened the fingers may be given any desired sidewise inclination by suitably adjusting the nuts 24.

It is evident from the foregoing description that the fingers of the moldboard are not only capable of adjustment in a forward and rearward direction, but may be given any desired adjustment to or from the outer face of the blade-section 10 of the moldboard.

Having thus described my invention, I claim as new and desire to secure by Letters Patent—

1. In a plow, a moldboard comprising a lower blade-section having an integral point, a portion of the blade-section extending downward at an angle to the body, forming a portion of the landside and a portion of the point of the plowshare, and fingers adjustably connected with the blade-section of the said moldboard, so as to be brought closer together or carried farther apart, which fingers follow the curvature of the moldboard and have rearward inclination, and means for sidewise adjustment of the said fingers, as specified.

2. In a plow, the combination, with a landside, of a moldboard consisting of a lower blade-section provided with an integral point and having one end turned downward to form a continuation of the landside at the point, and a series of fingers extending from the upper edge of the blade-section of the moldboard, which fingers follow the curvature of the blade-section, means whereby the fingers may be adjusted toward and from each other, a cross-bar located adjacent to the convexed surfaces of the fingers, and adjusting-bolts carried by the said cross-bar and connected one with each finger, whereby the fingers may have sidewise adjustment, for the purpose set forth.

3. In a plow, a moldboard comprising a share-section and a series of curved fingers extending from the upper edge of the share-section, said fingers being adjustable toward and from each other, and also to vary the sidewise inclination thereof, as set forth.

4. In a plow, the combination with the share-section of a moldboard, of curved fingers having their lower ends adjustably connected with the share-section, a cross-bar carried by the share-section in rear of the fingers, and bolts connecting the fingers with the cross-bar, substantially as described.

5. In a plow, the combination with the share-section of a moldboard, and the landside, of a plate secured to the rear of the share-section and provided with extensions projecting above the upper edge of the same, curved fingers secured to said extensions, a bar secured to the landside and to the plate of the share-section, a bracket carried by the said bar, a cross-bar carried by the bracket, and bolts connecting the fingers with the cross-bar, substantially as described.

6. In a plow, the combination with a moldboard formed of a share-section, and a finger-section, the fingers of which are curved and extend from the upper edge of the share-section, the landside, and a beam secured to the landside, of a bracket supported at the rear of the share-section, a cross-bar secured to the bracket, bolts connecting the fingers with the cross-bar, and handles, one of which is secured to the landside and to the beam and the other to the bracket and connected with the cross-bar by a brace, substantially as described.

In testimony whereof I have signed my name to this specification in the presence of two subscribing witnesses.

MICHAEL BYSTROM.

Witnesses:
ALAN BOGUE, Jr.,
JAS. S. THOMSON.